United States Patent [19]

Wagener et al.

[11] 4,262,991
[45] Apr. 21, 1981

[54] MECHANICAL STAGE FOR MICROSCOPES

[75] Inventors: Heinrich Wagener, Gottingen; Heinz Blessman, Rosdorf, both of Fed. Rep. of Germany

[73] Assignee: Carl Zeiss-Stiftung, Oberkochen, Fed. Rep. of Germany

[21] Appl. No.: 952,010

[22] Filed: Oct. 17, 1978

[30] Foreign Application Priority Data

Nov. 16, 1977 [DE] Fed. Rep. of Germany ....... 2751207

[51] Int. Cl.³ ............................................. G02B 21/26
[52] U.S. Cl. .................................................... 350/86
[58] Field of Search ..................... D16/57; 350/82, 86, 350/192, 238; 108/137, 144, 5

[56] References Cited

U.S. PATENT DOCUMENTS

| 1,830,347 | 11/1931 | Camden et al. | 108/137 |
| 1,970,410 | 8/1934 | Zemaitis | 108/63 |
| 2,034,110 | 3/1936 | Mechau | 350/86 |
| 2,094,968 | 10/1937 | Searles | 308/235 |
| 3,582,181 | 6/1971 | de Chveca | 350/238 |
| 3,830,560 | 8/1974 | Onanian | 350/238 |
| 4,012,111 | 3/1977 | Masterson | 350/86 |

FOREIGN PATENT DOCUMENTS 2242887 3/1974 Fed. Rep. of Germany ............. 350/35

Primary Examiner—John K. Corbin
Assistant Examiner—B. W. de los Reyes
Attorney, Agent, or Firm—Hopgood, Calimafde, Kalil, Blaustein & Lieberman

[57] ABSTRACT

A mechanical stage for microscopes includes a base plate, a stage plate displaceable along the base plate in one coordinate direction, and an object plate displaceable along the stage plate in a second coordinate direction and includes means for automatically maintaining the base plate, the stage plate, and the object plate in proper alignment with respect to a fixed reference. The stage plate directly laterally abuts the first of two parallel guides provided on the base plate and indirectly laterally abuts the second of these guides through a first movable member and an associated spring-loaded means. The object plate directly laterally abuts the first of two parallel guides provided on the stage plate and directly laterally abuts the second of these guides through a second movable member and an associated spring-loaded means.

6 Claims, 5 Drawing Figures

MECHANICAL STAGE FOR MICROSCOPES

The present invention relates to a mechanical stage for microscopes having a stage plate which is displaceable in one coordinate direction with respect to a fixed part and an object guide displaceable in the stage plate in a second coordinate direction, the stage plate having grooves to receive wire-race ball-bearing linear guides which cooperate with corresponding wire-race ball-bearing linear guides arranged in grooves of the fixed part and in grooves of the object guide.

In order to assure a precise movement of the stage plate and the object guide it is necessary to adjust at least one wire-race ball-bearing linear guide for each grooved part and thereby compensate for any play present.

In prior mechanical stages of the aforementioned type a groove may contain a rail which presses against a corresponding wire-race ball-bearing linear guide. The adjustment of this rail is effected by screws in the stage plate which are supported for displacement in direction of adjustment.

This known development is relatively expensive since the displaceable stage plate contains several adjustment elements. The adjustment of the wire-race ball-bearing linear guides by screws acting directly on the adjustment rail makes the adjustment for uniformly suitable travel over the entire range of displacement complicated and makes re-adjustment necessary.

The object of the present invention is to create a mechanical stage for microscopes which is simple to construct and inexpensive and in which the necessary adjustment of the wire-race ball-bearing linear guides is entirely free of maintenance.

This object is achieved with a mechanical stage of the type described above in which at least one of the wire-race ball-bearing linear guides in the fixed part and at least one of the wire-race ball-bearing linear guides in the object guide are each arranged alongside a corresponding adjustment rail which rests against spring elements acting perpendicular to the longitudinal axis of the fixed part and to the longitudinal axis of the object guide, respectively. The adjustment rails could also rest against the wire-race ball-bearing linear guides in the stage plate.

The spring elements may comprise coil springs each of which is arranged with its axis perpendicular to the appropriate longitudinal axis, as described above. It is sufficient if two coil springs per adjustment rail are present. The spring elements may also each comprise an undulated spring. The mechanical stage of the present invention thereby automatically effects the proper adjustment of the wire-race ball-bearing linear guide which is necessary for counteracting play. Adjustment and re-adjustment are completely eliminated.

The invention will be described in further detail below with reference to FIGS. 1 to 5 of the accompanying drawings, in which.

Figure 1:
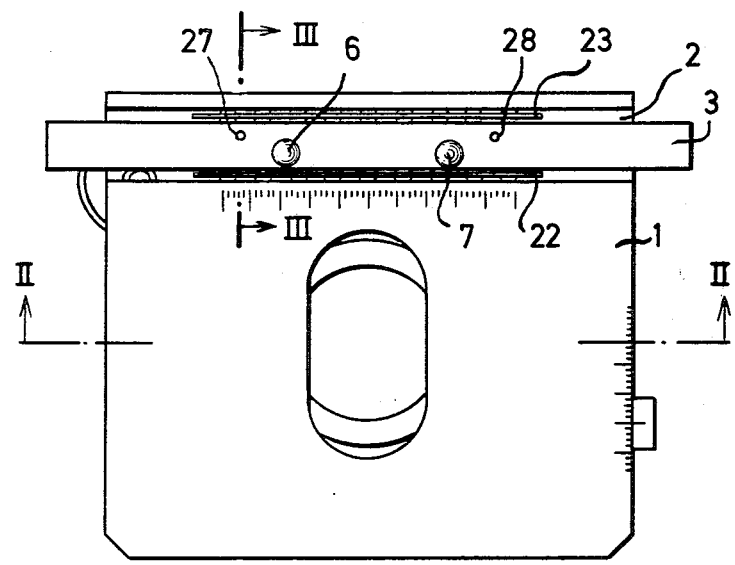
FIG. 1 is a top view of one illustrative embodiment of the new mechanical stage.

Referring to FIG. 1, a stage plate 1 supports the object to be examined under the microscope. The stage plate 1 contains a recess 2 in which an object guide 3 is displaceably arranged. To the object guide 3 there is connected a toothed rail 4 into which a gear wheel (not shown) turned by means of a knob 5 engages. Two screws 6, 7 are provided on the object guide 3 to clamp an object holder (also not shown) to the object guide 3.

Figure 2:
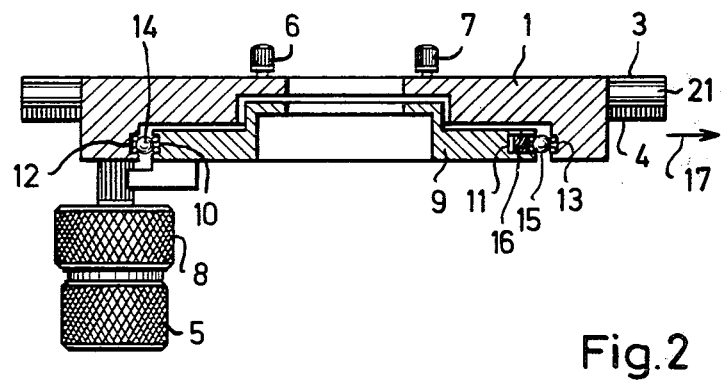
FIG. 2 is a section along the line II—II of FIG. 1.

The stage plate 1 is displaceable by means of a knob 8 perpendicular to the plane of the paper in FIG. 2 with respect to a fixed part 9, which is connected with the microscope. The fixed part 9 contains two grooves 10, 11 in which wire-race ball-bearing linear guides are arranged. The latter cooperate with similar linear guides in the grooves 12 and 13 of the stage plate 1. Arranged between each pair of the cooperating linear guides is a corresponding ball rail 14, 15.

The wire-race ball-bearing linear guide in the groove 11 is arranged alongside an adjustment rail 16 which rests against spring elements which exert a force in the direction indicated by the arrow 17. These elements are described in further detail with references to FIGS. 3 to 5.

The object guide 3 contains two grooves 18 and 19 in which wire-race ball-bearing linear guides are arranged. The latter cooperate with corresponding linear guides in the grooves 20 and 21 of the stage plate 1. Arranged between each pair of the linear guides is a corresponding ball rail 22, 23.

Figure 3:
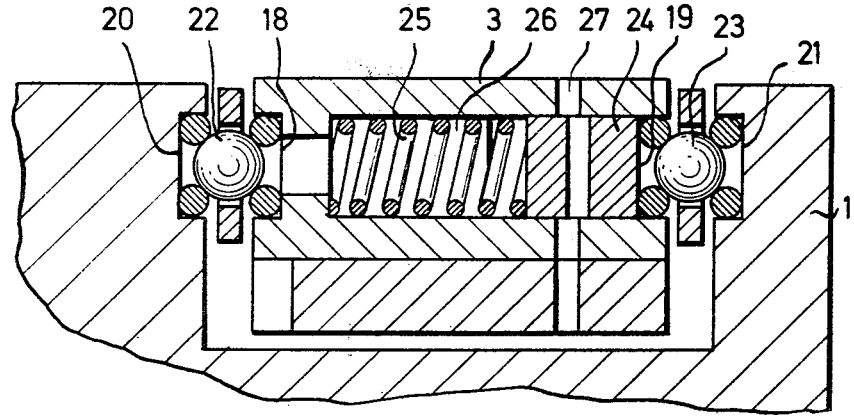
FIG. 3 is a section along the line III—III of FIG. 1.

The wire-race ball-bearing linear guide in the groove 19 is arranged alongside an adjustment rail 24 which rests against two coil springs. One of the coil springs 25 is shown in FIG. 3. Each of these coil springs is arranged in a corresponding bore-hole in the object guide 3. The borehole for the coil spring 25 is designated 26. The adjustment rail 24 and the object guide 3 are each provided with two corresponding mounting holes 27, 28. For mounting the object guide 3 onto the stage plate 1 the coil springs 25 are placed in their boreholes, and the adjustment rail 24 is placed in the groove 19. Two pins are then inserted through the mounting holes 27, 28 to restrain the rail 24 until the object guide 3 is mounted onto the stage plate 1. Thereupon the pins are pulled out and the coil springs automatically place the rail 24 in the proper position. Adjustment and re-adjustment are unnecessary.

Figure 5:
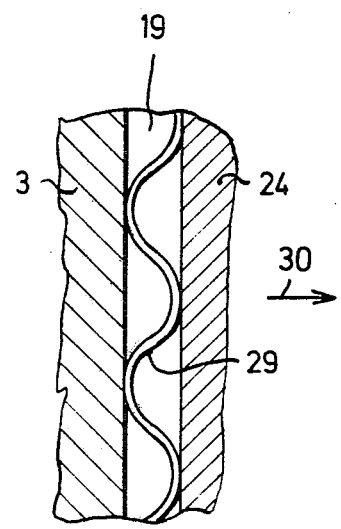
FIG. 5 is a section along the line V—V of FIG. 4.
Figure 4:
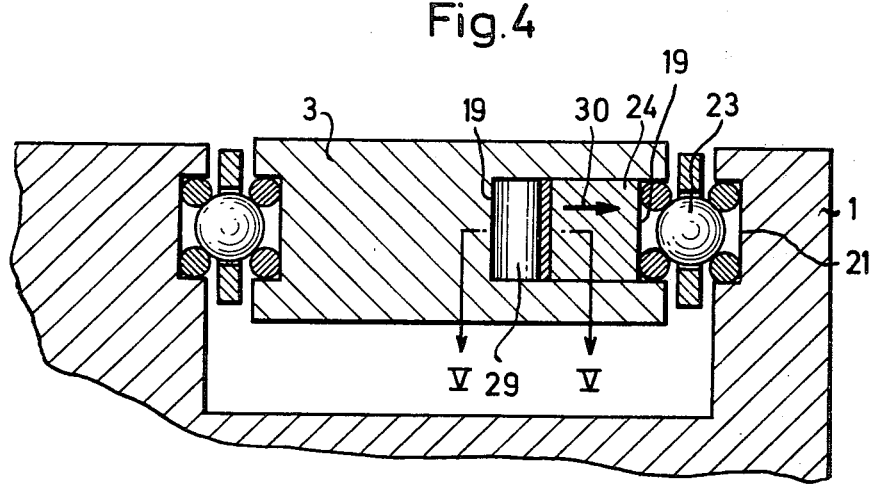
FIG. 4 is a section, corresponding to FIG. 3, through another embodiment.

In the embodiment shown in FIGS. 4 and 5, an undulated spring 29 is inserted between the rear wall of the groove 19 and the adjustment rail 24, said spring 29 pressing the rail 24 in the direction indicated by the arrow 30. In this case adjustment and re-adjustment are also unnecessary.

It is clear that the adjustment of the rail 16 contained in the fixed part 9 is effected in the same manner as the adjustment of the rail 24 in the object guide 3.

It will be clear to those skilled in the art that modifications and various of the above described preferred embodiments may be made without departing from the spirit and the scope of our invention. Consequently, our invention as claimed below may be practiced otherwise than as specifically described above.

What is claimed is:

1. A mechanical stage for microscopes including a fixed part, a stage plate displaceable along said fixed part in one rectilineal coordinate direction, and an object guide displaceable along said stage plate in a second rectilineal coordinate direction, said stage plate containing grooves for receiving wire-race ball-bearing linear guides which cooperate with corresponding wire-race ball-bearing linear guides arranged in grooves in said fixed part and in grooves in said object guide, characterized by at least one of said wire-race ball-bearing linear guides in the grooves of said fixed part (9) and at least one of said wire-race ball-bearing linear guides in the grooves in said object guide (3) each being arranged alongside a corresponding adjustment rail (16 and 24 respectively), each of said adjustment rails resting against corresponding spring elements and providing at least two spaced points of spring-loaded contact, and said spring elements acting perpendicular to the longitudinal axis of said fixed part and to the longitudinal axis of said object guide, respectively.

2. A mechanical stage according to claim 1, wherein said spring elements comprise coil springs.

3. A mechanical stage according to claim 1, wherein said spring elements comprise connected segments of a single undulated spring.

4. A microscope stage construction comprising a base plate adapted for fixed mounting on a microscope frame, a stage plate carried by said base plate and having a first guided suspension with respect to said base plate along a first axis, a first movable member disposed between said base plate and said stage plate, a first compressionally loaded resilient means adjacent to and reacting against and providing at least two spaced points of contact with said first movable member, an object plate carried by said stage plate and having a second guided suspension with respect to said stage plate along a second axis orthogonal to said first axis, a second movable member disposed between said stage plate and said object plate, and a second compressionally loaded resilient means adjacent to and reacting against and providing at least two spaced points of contact with said second movable member, said first suspension comprising two spaced parallel first-axis guides in said base plate, said stage plate having direct laterally guided abutment with the first of said first-axis guides and having indirect laterally guided abutment with the second of said first-axis guides through said first movable member and through said first compressionally loaded resilient means, said second suspension comprising two spaced parallel second-axis guides in said stage plate, said object plate having direct laterally guided abutment with the first of said second-axis guides and having indirect laterally guided abutment with the second of said second-axis guides through said second movable member and through said second compressionally loaded resilient means.

5. The microscope stage construction of claim 4, further comprising a releasable retaining means for holding said first movable member in a predetermined retracted position whereby said stage plate may be removably assembled to said base plate in the absence of compressionally loaded reaction on said second of said first-axis guides.

6. The microscope stage construction of claim 4, further comprising a releasable retaining means for holding said second movable member in a predetermined retracted position whereby said object plate may be removably assembled to said stage plate in the absence of compressionally loaded reaction on said second of said second-axis guides.

* * * * *